United States Patent [19]

Kanno et al.

[11] Patent Number: 4,973,817
[45] Date of Patent: Nov. 27, 1990

[54] METHOD OF AND APPARATUS FOR ASSEMBLING VEHICLE BODY

[75] Inventors: Hiroyuki Kanno, Tochigi; Hiroshi Sasaoka, Tokyo; Yoshitada Sekine, Yokohama, all of Japan

[73] Assignee: Nissan Motor, Co., Ltd., Yokohama, Japan

[21] Appl. No.: 377,388

[22] Filed: Jul. 10, 1989

[30] Foreign Application Priority Data

Jul. 18, 1988 [JP] Japan ................................ 63-176893

[51] Int. Cl.$^5$ ............................................. B23K 26/00
[52] U.S. Cl. ............................ 219/121.63; 219/121.74; 219/121.75
[58] Field of Search ....................... 219/121.63, 121.64, 219/121.78, 121.76, 121.6, 121.85, 121.74, 121.75

[56] References Cited

U.S. PATENT DOCUMENTS

| 4,651,283 | 3/1987 | Sciaky et al. | 219/121.63 |
| 4,654,505 | 3/1987 | Sciaky et al. | 219/121.63 |
| 4,681,396 | 7/1987 | Jones | 219/121.64 X |
| 4,691,905 | 9/1987 | Tamura et al. | 269/45 |

FOREIGN PATENT DOCUMENTS 37-12193  1/1962  Japan .
59-144595 8/1984  Japan .

Primary Examiner—C. L. Albritton
Attorney, Agent, or Firm—Pennie & Edmonds

[57] ABSTRACT

A method of and an apparatus for assembling a vehicle body is disclosed, which uses a laser welding equipment to join panels of a vehicle body main part. The panels are located and held by a gauge portion of a workpiece supporting jig and are welded at a held portion by means of a laser beam conducted through the workpiece supporting jig.

10 Claims, 4 Drawing Sheets

METHOD OF AND APPARATUS FOR ASSEMBLING VEHICLE BODY

BACKGROUND OF THE INVENTION

1. Field of the Invention

The present invention relates to a method of and an apparatus for assembling a vehicle body suitable for use on its assembly line.

2. Description of the Prior Art

In the past, a vehicle body assembly has been performed in a way to locate a plurality of workpieces, i.e., panels, by means of gauge portions fixed in a plurality of positions on a predetermined stage of an assembly line; temporarily join the located panels each other by a spot welding to assemble a vehicle body main part which greatly concerns the assembly precision of the vehicle body; and carry out a further spot welding as well as a joining of other panels. Additionally, the following process had to be repeated to obtain a predetermined assembly precision of the vehicle body: Measure the assembly precision of the assembled vehicle body manually perform a positional regulation by displacing, cutting and/or padding of each of the gauge portions and resume the vehicle body assembly. However, the manual positional regulation of the gauge portions takes a lot of time. Thus, there has been proposed, in Tokkaisho No. 59-144595, a locator having the gauge portions with drive mechanism by which the positional regulation thereof can be automatically carried out.

The above-mentioned locator includes a plurality of drive mechanisms for displacing each of the gauge portions in small increments. However, the plurality of gauges make it difficult to assure sufficient a space for welding arrangements such as a welding robot and a multispot welders used for joining the panels to the vehicle body main part, which can result in an insufficient number of welding points. On the other hand, if the number of welding points is increased, the number of gauge portions has to be decreased.

It is therefore an object of the present invention to provide a method and apparatus for assembling a vehicle body which allows an effective joining of the panels.

SUMMARY OF THE INVENTION

According to one aspect of the present invention, there is provided an apparatus for assembling a vehicle body, comprising:

means for locating a plurality of workpieces of a main part of the vehicle body, said workpiece locating means having a plurality of workpiece supporting means, said workpiece supporting means each including a gauge portion for locating and holding said plurality of workpieces, said workpiece locating means having a plurality of driving means for disposing said gauge portion;

means for generating a laser beam., and means for conducting said laser beam to said plurality of workpieces each other at portions held by said gauge portion.

According to another aspect of the present invention, there is provided a method of assembling a vehicle body, comprising the steps of:

locating a plurality of workpieces of a main part of the vehicle body, said workpiece locating means having a plurality of workpiece supporting means, said workpiece supporting means each including a gauge portion for locating and holding said plurality of workpieces, said workpiece locating means having a plurality of driving means for disposing said gauge portion;

generating a laser beam; and conducting said laser beam to said plurality of workpieces each other at portions held by said gauge portion.

DETAILED DESCRIPTION OF THE INVENTION

Figure 1:
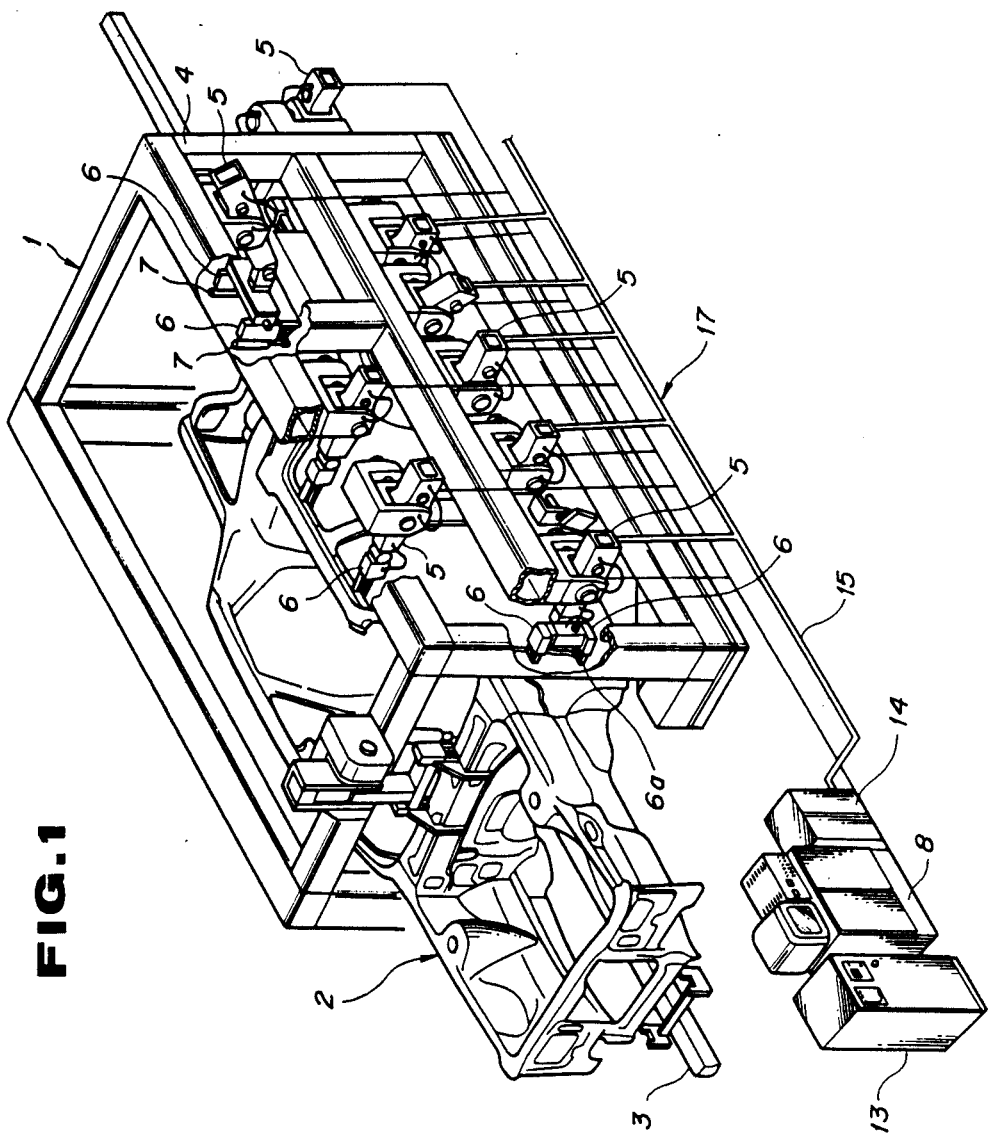
FIG. 1 is a diagrammatic view illustrating a portion of an assembly line of a vehicle body used in embodiments of an apparatus for assembling a vehicle body according to the present invention.

Referring now to FIG. 1, there is shown a vehicle body main part assembling stage of an assembly line of a vehicle body used in embodiments of the present invention. In FIG. 1, a locator 1 is disposed on the vehicle body main part assembling stage. As to this assembly line, workpieces, i.e., panels such as a floor main panel, right and left side panels, a rear panel, shelf panels and a cowl top assembly are carried into the vehicle body main part assembling stage. On this assembling stage, the panels are located by means of the locator in a manner to satisfy a predetermined assembly precision and the located panels are temporarily joined to each other to assemble a vehicle body main part 2 which greatly concerns the assembly precision of the vehicle body. Thereafter, the vehicle body main part 2 is transported by a shuttle conveyer 3 to other stages not shown) on which a further spot welding is carried out to the vehicle body main part 2 and panels such as front and rear roof rails and roof panels are assembled to form the vehicle body. On a subsequent stage (not shown , the assembly precision of the formed vehicle body is measured. For locating each of the panels of the vehicle body main part 2 on the vehicle body main part assembling stage, the locator 1 is provided with a frame 4, a plurality of robots 5 mounted thereon, each with at least one workpiece supporting jig 6 as its hand portion. The robot 5 is also provided with an air cylinder driven workpiece clamp device 7 as its hand portion, if condition demands.

Figure 2:
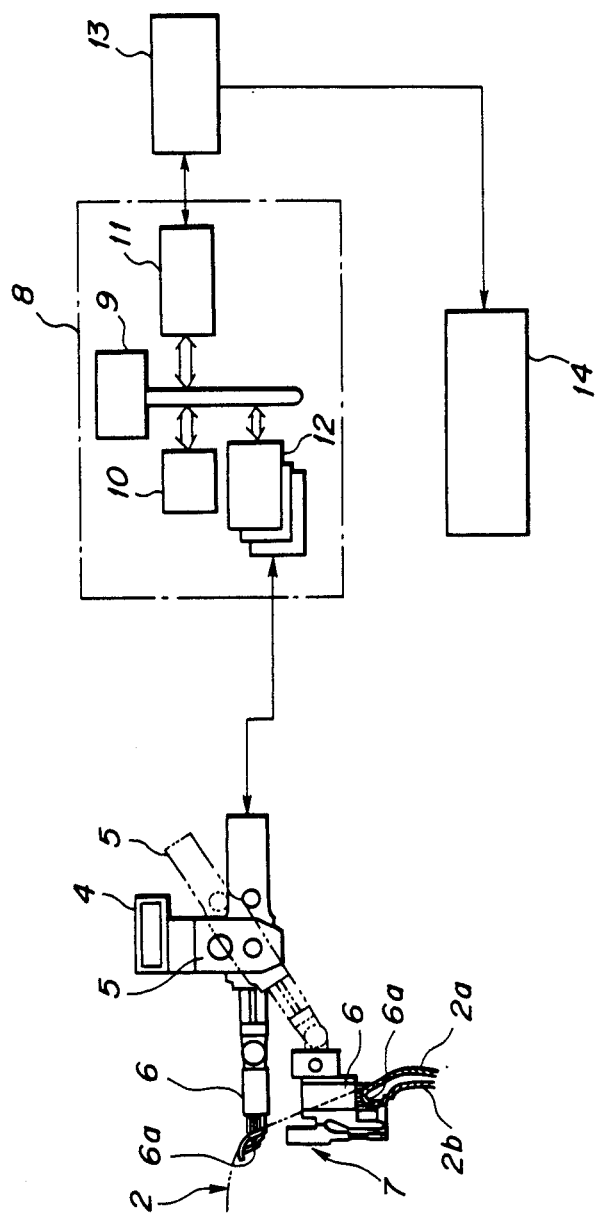
FIG. 2 is a diagrammatic view of a portion of the apparatus and illustrates a first embodiment.
Figure 3:
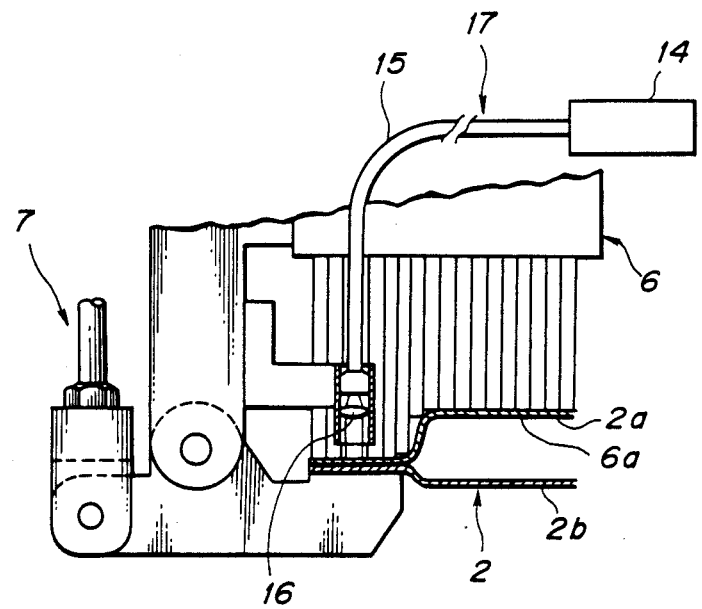
FIG. 3 is an enlarged vertical section illustrating the feature of the first embodiment shown in FIG. 2.

Referring to FIGS. 2 and 3, there is shown a first embodiment of the present invention. With the workpiece supporting jig 6, a plurality of elongate plates adjoining each other are moved or displaced one by one in the same direction by a servo motor and are arranged to form a predetermined shape with their end portions. Thereafter, the elongate plates are closely fixed by a fixing device to constitute a locating means, i.e., a gauge portion 6a capable of locating and holding a workpiece (Refer to Tokkaisho No. 59-144595 or Jitsugansho No. 62-12193). Based on such a function, the locator 1 forms a shape of the gauge portion 6a of the workpiece supporting jig 6 in accordance with a shape of each of the panels to be located (e.g., 2a and 2b) and disposes the gauge portion 6a of the workpiece supporting jig 6 on a predetermined position by means of the robot 5, thereby to locate each of the panels and fix it by the workpiece clamp device 7.

As shown in FIG. 2, a control unit 8 of the locator 1 includes an operation part 9 consisting of a CPU (central processing unit), a memory 10 used for storage and calculation of an operation indicative signal, an interface 11 for input of the operation indicative signal including position data of the gauge portion 6a of the workpiece supporting jig 6 and output of an operation confirmation signal a servo controller 12 for controlling a servo motor installed in each of joints of the robot 5 and one for driving the elongate plates of the workpiece supporting jig 6, and a controller (not shown) for controlling the fixing device of the workpiece supporting jig 6 and the workpiece clamp device 7. The control unit 8 controls operations of the robot 5, the workpiece supporting jig 6 and the workpiece clamp device 7 on the basis of the operation indicative signal inputted from a main control unit 13 of line control through the interface 11 and outputs the operation confirmation signal upon completion of the operations.

On the vehicle body main part assembling stage, there is also provided a laser welding equipment 17 which uses a laser beam emitted by a laser beam emitter 14 having a YAG (yttrium aluminum garnet) laser disposed outside frame 4 of the locator 1 as shown in FIG. 1. The laser beam is conducted, as shown in FIG. 3, to a condenser lens 16 disposed on the side of the workpiece supporting jig 6 of each robot 5 through an optical fiber cable 15, thereby to appropriately condense the laser beam and irradiate it on one of flanges of the panels 2a and 2b to be joined adjacent to a portion located and held by the workpiece supporting jig 6 and the workpiece clamp device 7. The laser beam emitter 14 is connected to and controlled by the main control unit 13 as shown in FIG. 2.

In the embodiment, with this assembly line, the vehicle body is assembled as described below:

First, design data of the vehicle body to be assembled which is designed by a CAD (computer-aided design) system, i.e., CAD data and position data for positioning the panels by each of the gauge portions 6a are inputted to the main control unit 13. In accordance with a predetermined program, the main control unit 13 calculates a position for each of the gauge portions 6a on the vehicle body main part assembling stage on the CAD data and determines an initial amount of displacement from an original position for each of the workpiece supporting jigs 6 which is used for disposing the workpiece supporting jigs 6 to locate each of the gauge portions 6a on the calculated position. At the same time, the control unit 13 disposes the elongate plates of each of the workpiece supporting jigs 6 in accordance with a shape of the panel and determines the initial amount of displacement from the original position for the elongate plates to form the gauge portion 6a. The main control unit 13 outputs the two initial amounts of displacement to the control unit 8 of the locator 1 with the operation indicative signal. Upon receipt of the signal, the control unit 8 starts each robot 5 to dispose each of the workpiece supporting jigs 6 in response to the initial amount of displacement and urges the workpiece supporting jigs 6 to form the gauge portions 6a. Next, with the locator 1 having the gauge portions 6a in predetermined positions based on the CAD data, each of the panels of the vehicle body main part 2 is located respectively. In this state, the control unit 8 urges the workpiece clamp device 7 to hold the panels. Upon completion of positioning of the panels, the control unit 8 outputs the operation confirmation signal to the main control unit 13. After receipt of the operation confirmation signal, the main control unit 13 enables the laser beam emitter 14 to generate a pulsed YAG laser beam. As stated above, the laser beam is conducted to the condenser lens 16 disposed on the side of the workpiece supporting jig 6 through the optical fiber 15 and is focussed onto one of the flanges of the panels to be joined adjacent to a portion located and held by the workpiece supporting jig 6 and the workpiece clamp device 7, so as to form a welding point for joining the flanges each other.

In this manner, the gauge portions 6a are automatically arranged in accordance with the CAD data, thereby to locate and hold the panels. In this state, the panels are welded by the laser beam to assemble the vehicle body main part 2.

Thereafter, the workpiece supporting jigs 6 are returned to the original position to release the vehicle body main part 2. The released main part 2 is transported by the shuttle conveyer 3 from the vehicle body main part assembling stage to other stages on which a further spot welding is carried out to the vehicle body main part 2 and panels such as front and rear roof rails and roof panels are assembled to form the vehicle body. On a subsequent stage, the assembly precision of the formed vehicle body is measured. Additionally, the initial amounts of displacement for the workpiece supporting jigs 6 and the elongate plates determined on the CAD data are corrected based on a result of measurement of the assembly precision. From the next vehicle body assembly, the following process is repeated: Dispose and form the gauge portions 6a in accordance with the corrected amounts of displacement to assemble the vehicle body main part 2; and correct further the amounts of displacement for the workpiece supporting jigs 6 and the elongate plates from the result of measurement of the assembly precision of the vehicle body including the vehicle body main part 2.

Therefore, in the first embodiment, the gauge portions 6a are automatically initially arranged in accordance with the CAD data to assemble the vehicle body main part 2, consequently, the vehicle body. By repeating the vehicle body assembly, the position of the gauge portions 6a is automatically regulated, resulting in increase in the assembly precision of the vehicle body to a predetermined value. Additionally, the panels are joined to each other by the laser welding equipment 17 having the optical fiber cable 15 disposed between the workpiece supporting jig 6 and the robot 5 and connecting the laser beam emitter 14 which is provided outside the frame 4 of the locator 1 with the condenser lens 16 disposed in the workpiece supporting jig 6. This arrangement minimizes the operation space of a welding arrangement thereby permitting formation of a sufficient number of welding points to obtain a predetermined welding strength.

Figure 4:
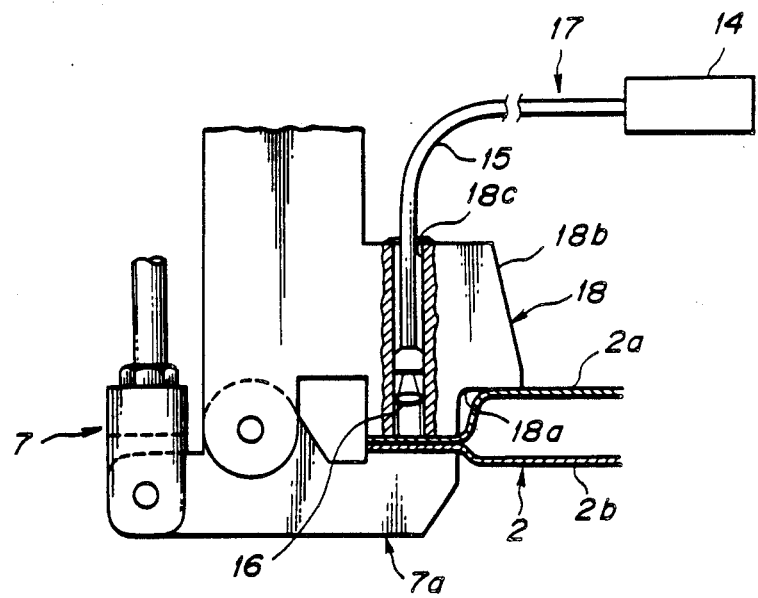
FIG. 4 is a view similar to FIG. 3 illustrating a second embodiment.

Referring to FIG. 4, there is shown a second embodiment of the present invention in which a gauge portion 18a of a workpiece supporting jig 18 supported and displaced by a robot 6 has a fixed shape. Further, a laser welding equipment 17 utilizes an optical fiber cable 15 extending into a through hole 18c in a gauge post 18b portion of the supporting jig 18, in a position opposite to a clamp arm 7a of a workpiece clamp device 7, to conduct the laser beam to a condenser lens 16 disposed in the through hole 18c. With the welding equipment 17, the laser beam is conducted to a located and held portion of flanges of the panels (2a and 2b in FIG. 4) to weld this portion, resulting in further increase in the assembly precision of the vehicle body.

Figure 5:
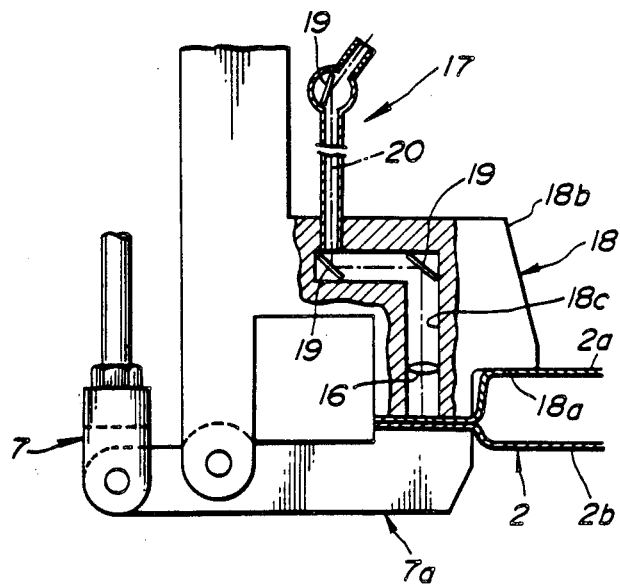
FIG. 5 is a view similar to FIG. 3 illustrating a third embodiment.

Referring to FIG. 5, there is shown a third embodiment of the present invention in which a laser welding equipment 17 utilizes a bent optical passage 20 in a gauge post 18b of a workpiece supporting jig 18 and from a laser beam emitted (not shown) by means of mirrors 19 to conduct the laser beam to a condenser lens 16 disposed in the gauge post 18b. In the embodiment, the optical passage 20 is provided with the mirrors 19 in place of the optical fiber cable so that a loss of the laser beam is reduced, thereby preventing attenuation of the laser beam Having described the present invention as related to the embodiments shown in the accompanying drawings, it is to be understood that the present invention is not limited by any of the details of description. By way of example, a laser other than the YAG laser may be used on condition that its output is satisfactory for welding.

What is claimed is:

1. An apparatus for welding a plurality of workpieces, comprising:
    a clamp including a clamp arm;
    a workpiece supporting jig operatively connected to said clamp, said workpiece supporting jig including means for defining a gauge portion, said gauge portion cooperating with said clamp arm to hold the plurality of workpieces therebetween, said gauge portion being formed with an opening:
    a focusing lens mounted within said gauge portion defining means adjacent said opening;
    means for generating a laser beam; and
    means for conducting said laser beam to said focusing lens, said conducting means having a portion mounted within said gauge portion defining means.

2. An apparatus as defined in claim 1, wherein said gauge portion defining means include a plurality of elongate plates which are slidably connected one after another, said plurality of elongate plates having one end defining said gauge portion.

3. An apparatus as defined in claim 2, wherein said gauge portion defining means include a hole extending to said opening, and wherein said portion of said conducting means is disposed in said hole.

4. An apparatus as defined in claim 2, wherein said laser beam conducting means include an optical fiber cable extending through said gauge portion defining means.

5. An apparatus as defined in claim 3, wherein said laser beam conducting means include a plurality of mirrors mounted within said hole.

6. An apparatus as defined in claim 4, wherein said laser beam generating means include a YAG laser.

7. An apparatus as defined in claim 3, wherein said laser beam conducting means include an optical fiber cable extending through said hole of said gauge portion defining means.

8. An apparatus for welding a plurality of workpieces, comprising:
    a clamp including a clamp arm;
    a workpiece supporting jig operatively connected to said clamp, said workpiece supporting jig including an assembly of a plurality of elongate plates which are slidably connected one after another, said plurality of elongate plates having one end defining a gauge portion, said gauge portion cooperating with said clamp arm to hold the plurality of workpieces therebetween, said gauge portion being formed with an opening;
    a focusing lens mounted within said assembly of said plurality of elongate plates;
    means for generating a laser beam; and
    and optical fiber cable having one end connected to said laser beam generating means and an opposite end portion extending through said assembly of said plurality of elongate plates to said focusing lens.

9. An apparatus for welding a plurality of workpieces, comprising:
    a clamp including a clamp arm;
    a workpiece supporting jig operatively connected to said clamp, said workpiece supporting jig having a gauge portion, said gauge portion cooperating with said clamp arm to hold the plurality of workpieces therebetween, said gauge portion being formed with an opening, said workpiece supporting jig being formed with a hole extending to said opening;
    a focusing lens mounted within said hole adjacent said opening;
    means for generating a laser beam, and
    an optical fiber cable having one end connected to said laser beam generating means and an opposite end portion extending through said hole to said focusing lens.

10. An apparatus for welding a plurality of workpieces, comprising:
    a clamp including a clamp arm;
    a workpiece supporting jig operatively connected to said clamp, said workpiece supporting jig having a gauge portion, said gauge portion cooperating with said clamp arm to hold the plurality of workpieces therebetween, said gauge portion being formed with an opening, said workpiece supporting jib being formed with a hole extending to said opening;
    means for generating a laser beam, and
    means for conducting said laser beam to said focusing lens, said laser beam conducting means including a plurality of mirrors mounted within said hole.

* * * * *